Dec. 5, 1950   R. F. E. STEGEMAN   2,532,959
LENS MOUNTING FOR SEMIRIMLESS SPECTACLES
Filed April 12, 1947
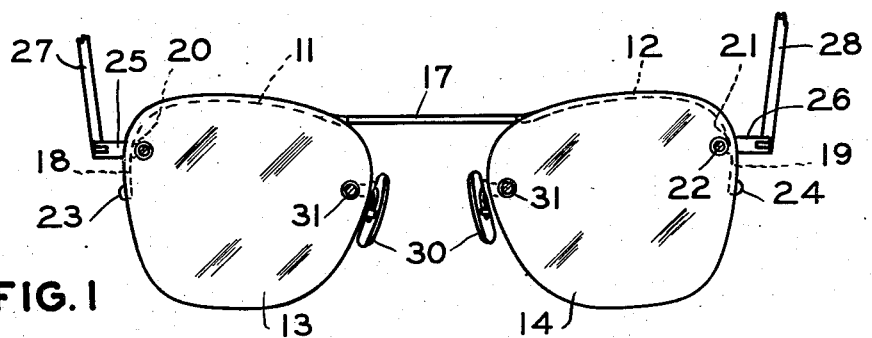
FIG. 1
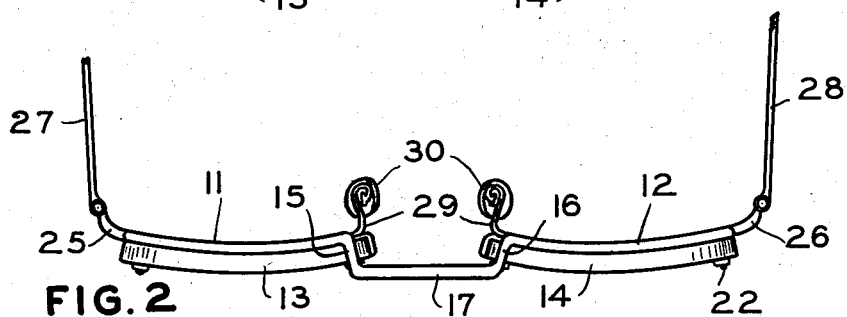
FIG. 2
FIG. 3
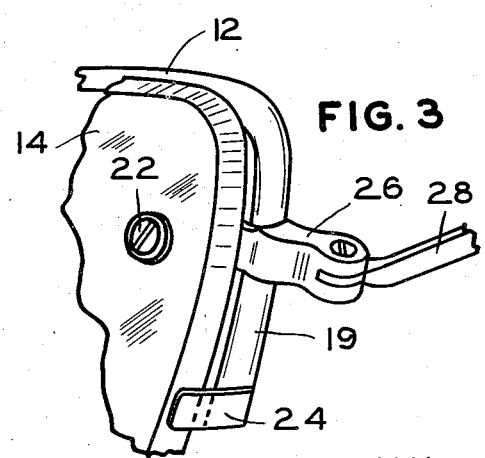
FIG. 4
FIG. 5
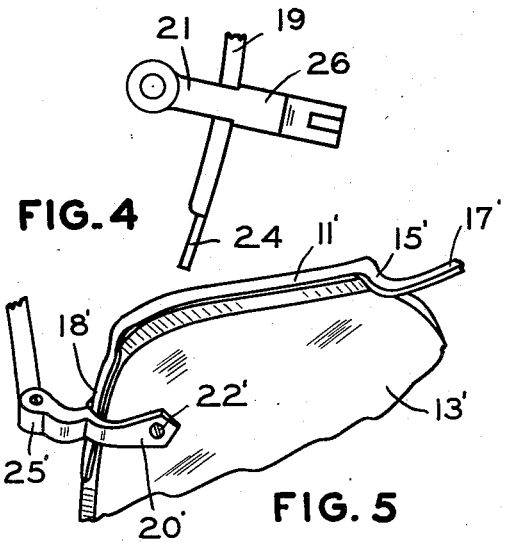
R. F. E. STEGEMAN
Inventor
Attorney Patented Dec. 5, 1950

2,532,959

UNITED STATES PATENT OFFICE 2,532,959

LENS MOUNTING FOR SEMIRIMLESS SPECTACLES

Raymond F. E. Stegeman, Greece, N. Y., assignor to Bausch & Lomb Optical Company, Rochester, N. Y., a corporation of New York Application April 12, 1947, Serial No. 741,038

6 Claims. (Cl. 88—41)

This invention relates to spectacles and more particularly it has reference to a spectacle of the so-called semi-rimless type in which the rim members extend only partially along the edges of the upper portions of the lenses.

One of the objects of this invention is to provide a spectacle of the type described which will be neat in appearance, efficient in operation and capable of being easily manufactured. Another object is to provide a semi-rimless spectacle mounting which is so constructed that a single given mounting will accommodate lenses of different eye sizes and thereby reduce to a minimum the stock of frames required by the optician. A further object is to provide a mounting of the type described in which locating means are provided for the lenses which are held on the mounting only by connections at the temporal sides of the lenses. Still another object is to provide a spectacle mounting of the type described which will enable the optician to readily attach lenses thereto and make the necessary adjustments easily. These and other objects and advantages reside in certain novel features of construction, arrangement, and combination of parts, as will hereinafter be more fully described and pointed out in the appended claims.

Referring to the drawings:

Fig. 1 is a front elevation, with the temples broken away, of a semi-rimless spectacle embodying my invention.

Fig. 2 is a top plan view thereof.

Fig. 3 is a fragmentary view of the temporal parts of the lens and rim member.

Fig. 4 is a view of a constructional detail.

Fig. 5 is a modification of my invention.

A preferred embodiment of my invention is disclosed in the drawings wherein 10 indicates a semi-rimless spectacle embodying the spaced rim members 11 and 12, which are located, respectively, behind the lenses 13 and 14. As shown on the drawing, the rim members 11 and 12 extend along the upper temporal and top edges of the lenses and terminate, respectively, in the parts 15 and 16 which extend forwardly and transversely of the upper edges of the lenses adjacent their nasal portions. The parts 15 and 16 are connected by a bridge 17 which is positioned in a plane which lies substantially in front of the lenses.

Secured to the temporal portions 18 and 19 of the respective rim members 11 and 12 are the straps 20 and 21 which are threaded to receive screws 22 passed through holes formed in the upper temporal portions of the lenses. The temporal portions 18 and 19 of the rim members carry, at their lower ends, the forwardly projecting fingers 23 and 24 which engage the temporal edges of the lenses at points which are spaced below the screws 22. Since the temporal portions 18 and 19 are resilient, the lenses will, before the screws 22 are tightened, tend to be turned about the screws as pivots until the upper edges of the lenses engage the forwardly extending parts 15 and 16. The lenses will thereby be properly located in operative position on the mounting and the screws 22 may then be tightened. If the screws should loosen during use of the mounting, the lenses will still be held in proper location on the mounting. The rim members 11 and 12 are also resilient so that if the lenses are firmly held to the temporal ends of the rim members, the resilience of the rim members will also tend to urge the upper edges of the lenses into engagement with the forwardly extending parts. Should the parts get out of adjustment so that the resilience of the rim members no longer serves to hold the lenses against the parts 15 and 16, the loosened lenses will still be held in proper position when on the face of the wearer because the weight of the lenses will, when the pads 30 contact the nose, cause the lenses to turn about the screws until the upper edges of the lenses contact parts 15 and 16.

The temporal portions 18 and 19 also carry, respectively, the endpieces 25 and 26 which pivotally support the temples 27 and 28. Secured to the nasal edges of the respective lenses are the rearwardly extending arms 29 which carry the usual nose engaging pads 30. The arms 29 may be secured by any suitable means such, for example, as screws 31 which pass through holes drilled in the lenses and are threaded into straps, as will be understood by those skilled in the art.

In the modification shown in Fig. 5, the rim member 11' is positioned rearwardly of the lens 13' and extends along the top edge thereof. Adjacent the nasal edge of the lens, the rim member 11' has a forwardly extending part 15' which lies transversely of the edge of the lens and is connected to a bridge member 17'. Near the top temporal part of the lens, the rim member 11' extends forwardly and then downwardly to provide the shoe portion 18' which bears against the temporal edge of the lens. The shoe portion 18' is secured, as by soldering, to a strap 20' which is secured to the lens by a screw 22' passing through a hole in the lens and threaded into the rear strap, not shown. The strap 20' also carries the usual endpiece 25' for pivotally supporting a temple. The shoe portion is relatively short and stiff and extends only slightly below the strap 20' so that the lens is securely held to the temporal end of the rim member. The lens 13' is mounted so that its upper edge, adjacent the nasal portion, engages the under side of part 15' and is yieldably held against the part 15' because of the resilience of rim member 11'. A suitable nose engaging pad is attached to the nasal side of lens 13' just as in the form of the invention disclosed in Figs. 1–4.

From the foregoing, it will be apparent that I am able to attain the objects of my invention and provide an improved spectacle of the semi-rimless type. While I have shown the rim members and bridge as being formed of a single integral wire, it is obvious that the rim members may be separately formed and secured to different types of bridges, such as by soldering or other suitable means. Since the nose pads are supported directly by the lenses, it is possible to mount lenses of different eye sizes on a single given mounting. This permits the optician to fill various types of prescriptions from a minimum stock of mountings. The construction of my mounting also greatly facilitates the adjustment of the parts and the attachment of the lenses thereto. The forwardly extending fingers 23 and 24 can, of course, be formed integrally with the temporal portions 18 and 19 of the rim members. The portions 18 and 19 may be given greater resilience by making them thinner than the other parts of the rim members. In both forms of the invention, the forwardly extending parts 15, 16 and 15' serve as limiting stops to locate the lenses on the mountings. Various other modifications may obviously be made without departing from the spirit of my invention as pointed out in the appended claims.

I claim:

1. In a semi-rimless spectacle, the combination of a lens, a resilient rim member positioned rearwardly of the plane of the lens and extending along the upper and temporal edges thereof, a part extending forwardly from the rim member across the upper edge of the lens and adjacent the nasal side thereof, means on the member in yielding engagement with the temporal edge of the lens for urging the lens against said part to limit movement of the lens, a strap secured to the temporal portion of the rim member and extending along a surface of the lens, and means for securing the lens to the strap, the nasal side of the lens being unattached to the rim member, said part serving as a stop to limit the upward movement of the lens produced by the first named means.

2. In a spectacle, the combination of a pair of spaced lenses, a bridge between the lenses, a pair of rim members each positioned rearwardly of the plane of one of the lenses and extending along the temporal and top edges thereof, said rim members having resilient portions, a part extending transversely of the upper edge of the lens and forwardly from each member adjacent the nasal portion thereof, the respective ends of the bridge being connected to said parts, and means connecting each lens only to the temporal portion of its respectively adjacent member, and means on the resilient portions in yielding engagement with the temporal edges of the lenses urging the top nasal portions of the lenses into engagement with said parts to limit movement of the lenses.

3. In a semi-rimless spectacle, the combination of a lens, a rim member positioned rearwardly of the plane of the lens and extending along the temporal and upper edges thereof, a part extending forwardly from said rim member across the upper edge of the lens adjacent the nasal portion thereof, a pivot carried by the temporal portion of the rim member, said lens being in pivotal engagement with the pivot, and means on the temporal portion of the rim member below said pivot yieldably engaging the temporal edge of the lens and urging the upper edge of the lens into engagement with said part.

4. In a semi-rimless spectacle, the combination of a lens, a rim member positioned rearwardly of the plane of the lens and extending upwardly from a point adjacent the temporal side of the lens and along the upper edge of the lens and thence forwardly across the edge of the lens to form a bridge which is positioned in a plane lying in front of the lens, a pivot carried by the temporal portion of the rim member and projecting through a hole in the lens, the temporal portion of the rim member being resilient and carrying a part which yieldably engages the temporal edge of the lens below the pivot and urges the upper edge of the lens into engagement with the forwardly extending part of the rim member.

5. In a semi-rimless spectacle, the combination of a lens, a rim member positioned rearwardly of the plane of the lens and extending along the upper edge and partially down the temporal edge of the lens, a part extending forwardly from the member transversely of the lens adjacent the upper nasal portion thereof, a strap secured to the temporal portion of the member and positioned against the rear surface of the lens, a screw passed through a hole in the lens and threaded into said strap, the temporal portion of the member being resilient, and a finger carried by the temporal portion of the member below the screw, said finger being urged into yieldable engagement with the temporal edge of the lens by the resilience of the member whereby the lens will be pivotally moved about the screw to bring the upper edge of the lens into engagement with the part extending forwardly from the member.

6. A semi-rimless spectacle comprising a pair of spaced lenses, a rim member positioned rearwardly of the plane of each lens, each rim member extending partially along the top and temporal edges of its respectively adjacent lens, a part extending forwardly from the nasal portion from each rim member and across the edge of the adjacent lens, a bridge connecting said parts, a strap secured only to the temporal portion of each rim member and positioned against the rear surface of the adjacent lens, screws passed through holes in the temporal portions of the lenses and threaded into the straps, fingers carried by the temporal portions of the rim members below the straps, said fingers being constructed and arranged to yieldably engage the temporal edges of the lenses whereby the upper edges of the lenses are pivoted to turn about the screws and urged against said parts, a pair of temples carried by the temporal portions of the rim members and a pair of nose engaging pads carried by the respective nasal edges of the lens.

RAYMOND F. E. STEGEMAN.

REFERENCES CITED

The following references are of record in the file of this patent:

UNITED STATES PATENTS

| Number | Name | Date |
| --- | --- | --- |
| 1,959,396 | Thomson | May 22, 1934 |
| 2,004,445 | Meyer | June 11, 1935 |
| 2,057,855 | Stayman | Oct. 20, 1936 |
| 2,108,875 | Uhlemann | Feb. 22, 1938 |
| 2,176,590 | Kirk et al. | Oct. 17, 1939 |
| 2,236,304 | Snavely | Mar. 25, 1941 |
| 2,239,575 | Schwab | Apr. 22, 1941 |
| 2,255,687 | Splaine | Sept. 9, 1941 |
| 2,256,502 | Splaine | Sept. 23, 1941 |
| 2,257,811 | Pomeranz | Oct. 7, 1941 |
| 2,343,574 | Page | Mar. 7, 1944 |
| 2,383,021 | Splaine | Aug. 21, 1945 |